(12) United States Patent
Choi

(10) Patent No.: US 7,310,082 B2
(45) Date of Patent: Dec. 18, 2007

(54) COMPUTER DISPLAY HAVING DISPLAY DIRECTION CONTROL

(75) Inventor: Yoon-man Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 10/855,963

(22) Filed: May 28, 2004

(65) Prior Publication Data
US 2005/0024347 A1 Feb. 3, 2005

(30) Foreign Application Priority Data
Aug. 1, 2003 (KR) .................... 10-2003-0053375

(51) Int. Cl.
*G09G 5/00* (2006.01)
*G06K 11/06* (2006.01)
*G06F 1/16* (2006.01)
*G06F 3/00* (2006.01)

(52) U.S. Cl. .................. 345/156; 345/178; 178/18.01; 178/19.01; 178/20.01; 361/681; 361/683; 725/37; 725/44; 725/47

(58) Field of Classification Search ........ 345/156–178; 178/18.01, 18.03, 18.04, 18.1, 19.01, 19.02, 178/19.07, 20.01–20.04; 361/681–683; 715/858–866; 725/37, 44, 47
See application file for complete search history.

(56) References Cited

U.S. PATENT DOCUMENTS 5,661,632 A * 8/1997 Register .................... 361/683
5,729,251 A * 3/1998 Nakashima ................. 709/250
5,864,335 A * 1/1999 Kuzunuki et al. .......... 345/173
5,936,619 A * 8/1999 Nagasaki et al. ........... 345/205
6,597,384 B1 * 7/2003 Harrison .................... 345/204
6,882,335 B2 * 4/2005 Saarinen .................... 345/156
7,184,025 B2 * 2/2007 Williams et al. ........... 345/169

FOREIGN PATENT DOCUMENTS

JP 2-59920 2/1990
JP 7-104889 4/1995

(Continued)

OTHER PUBLICATIONS

Notice of Official Action issued by the Korean Intellectual Property Office on Jul. 28, 2005 in Korean Patent Application No. 10-2003-0053375 related to the present above-identified pending US patent application, including English language translation thereof, 4 pages total.

(Continued)

*Primary Examiner*—Henry N Tran
(74) *Attorney, Agent, or Firm*—Staas & Halsey LLP

(57) ABSTRACT

A display has a display part displaying an image signal, an image signal processor providing the image signal to the display part, a pen sensor sensing at least two locations on a main body of the pen positioned on the display part and generating a first pen sensor signal and a second pen sensor signal, and a controller controlling the image signal processor to display the image as rotated based on the first pen sensor signal and the second pen sensor signal. The display senses an exact display direction which a user wants to use without operating a display direction converting switch and rotates the displayed image according to the sensed display direction.

14 Claims, 14 Drawing Sheets

FOREIGN PATENT DOCUMENTS

| | | |
|---|---|---|
| JP | 4-148221 | 5/1995 |
| JP | 08-129557 | 5/1996 |
| JP | 09-097311 | 4/1997 |
| JP | 11-196397 | 7/1999 |
| KR | 1996-9828 | 7/1996 |
| KR | 2001-37685 | 5/2001 |
| KR | 2002-87912 | 11/2002 |
| KR | 2003-8517 | 1/2003 |
| KR | 2003-60251 | 7/2003 |

OTHER PUBLICATIONS

Korean Intellectual Property Office Notice of Official Action issued Jan. 23, 2006 in Korean Patent Application No. 10-2003-0053375 corresponding to the present above-identified pending US patent application (2 pages), including English translation thereof (1 page).

* cited by examiner

COMPUTER DISPLAY HAVING DISPLAY DIRECTION CONTROL

CROSS-REFERENCE TO RELATED APPLICATIONS

This application claims the benefit of Korean Patent Application No. 2003-53375, filed Aug. 1, 2003 in the Korean Intellectual Property Office, the disclosure of which is incorporated herein by reference.

BACKGROUND OF THE INVENTION

1. Field of the Invention

The present invention relates to a display and a computer main body, such as a portable computer, with the display, and more particularly, a display sensing a user preferred output direction without operating a switch for changing the display direction, and displaying an image rotated corresponding to the output direction.

2. Description of the Related Art

In general, a display displays an image either in a horizontal direction or a vertical direction. As shown in FIG. 1 and FIG. 3, a display direction converting switch 130 capable of converting the direction of an output image relative to a rotation position of a display part 120 is provided in a conventional display 101. Thus, a user rotates and places the display part 120, and then controls the display direction converting switch 130 to convert the display direction of the image, if the user feels that the displayed image would be more convenient to use (view) after rotating the position of the display part 120 (refer to FIGS. 2A and 2B). For example, it is efficient to display a MICROSOFT EXCEL file (or a spread sheet display image) widthwise as shown in FIG. 2A, and other document files, such as drawings, displayed in a length direction after rotating the display to lengthwise as shown in FIG. 2B.

However, to operate the display direction converting switch 130 of the conventional display part 101, at first the display part 120 has to be rotated, and afterwards the display direction converting switch 130 is operated. Further, if the current display direction converting switch 130 is mistakenly operated without rotating the display part 20, the display direction converting switch 130 is designed to display image patterns in a wrong direction according to the operation signal from the switch 130.

Also, the display direction converting switch 130 of the conventional display displays has two predetermined directions, a vertical direction and a horizontal direction, and displays images in only one direction selected out of two directions. Therefore, two display direction converting switches 130 for four directions (up/down/left/right) are required to display the images in one direction selected out of four directions for a 360-degree rotatable display part 120, as disclosed in the Japan First Publication No. 1996-129557. To solve the above problem, a direction sensor using mercury and electrodes is disclosed in the Japan First Publication No. 1996-129557. However, using the mercury may cause mercury leakage, and further environmental pollution.

Also, a direction detective sensor disclosed in Japan First Publication No. 1999-196397 has a plurality of piezoelectric sensors placed in a sphere casing along an inner circumference of the casing in a regular interval, and senses directions using a pressure generated by a gravitational direction of a metal ball provided therein. However, the metal ball contact with the piezoelectric sensor in the sphere casing is shaky rather than stable, and thus the sensor can be desensitized to a rotation direction, causing an inaccurate sensing.

SUMMARY OF THE INVENTION

Accordingly, the present invention provides a display sensing an exact display direction which a user wants to use without operating a display direction converting switch, and displaying an image rotated corresponding to the rotated display direction. The present invention also provides a computer to which the foregoing display is equipped.

Additional aspects and/or advantages of the invention will be set forth in part in the description which follows and, in part, will be obvious from the description, or may be learned by practice of the invention.

The present invention may be achieved by providing a display comprising a display part displaying an image signal; an image signal processing part providing the image signal to the display part; a pen sensor sensing at least two locations on a main body of a pen positioned on the display part and generating a first pen sensor signal and a second pen sensor signal; and a controller controlling the image signal processing part to display on the display part an image rotated based on the first pen sensor signal and the second pen sensor signal.

According to an aspect of the present invention, the pen sensor uses differing resonating signals output from resonant circuits which are respectively built in the at least two locations of the main body of the pen having different resonant frequencies.

According to an aspect of the present invention, the controller sets a temporary coordinates system for the display part, and controls the image signal processing part to display the image as rotated relative to an angle formed by a line connecting coordinates corresponding to the first sensor signal and the second sensor signal, respectively, and a randomly defined standard line.

The present invention may also be achieved by providing a portable computer having a main body and a display part comprising an image signal processing part providing an image signal to the display part; a pen sensor sensing at least two locations on a main body of a pen positioned on the display part and generating a first pen sensor signal and a second pen sensor signal; and a controller controlling the image signal processing part to display on the display part an image rotated based on the first pen sensor signal and the second pen sensor signal.

According to an aspect of the present invention, the pen sensor uses differing resonating signals output from resonant circuits which are respectively built in the at least two locations of the main body of the pen and having different resonant frequencies.

According to an aspect of the present invention, the controller sets a temporary coordinates system for the display part, and controls the image signal processing part to display the image as rotated relative to an angle formed by a line connecting coordinates corresponding to the first sensor signal and the second sensor signal, respectively, and a randomly defined standard line.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
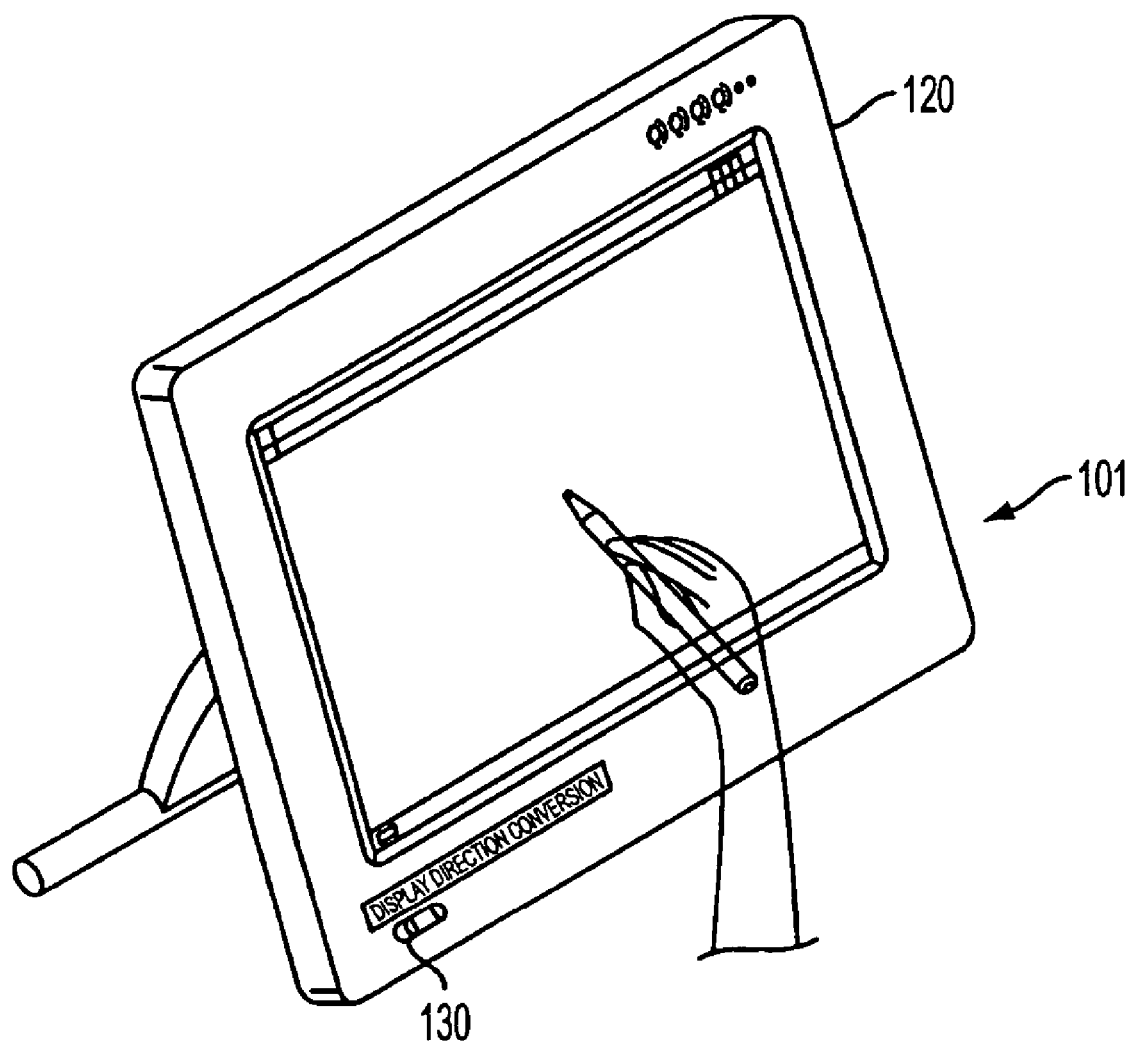
FIG. 1 is a perspective view of a conventional display.
Figure 2A:
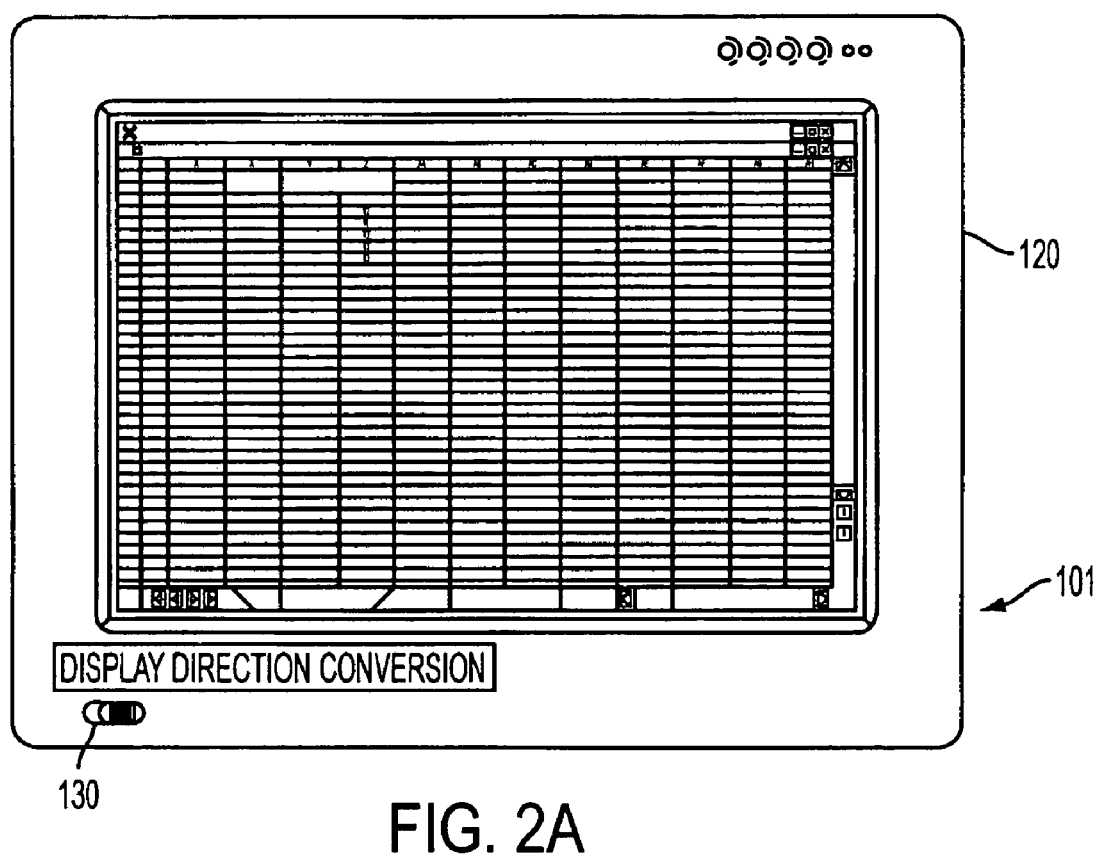
FIGS. 2A and 2B are diagrams of display statuses of the display in FIG. 1.
Figure 2B:
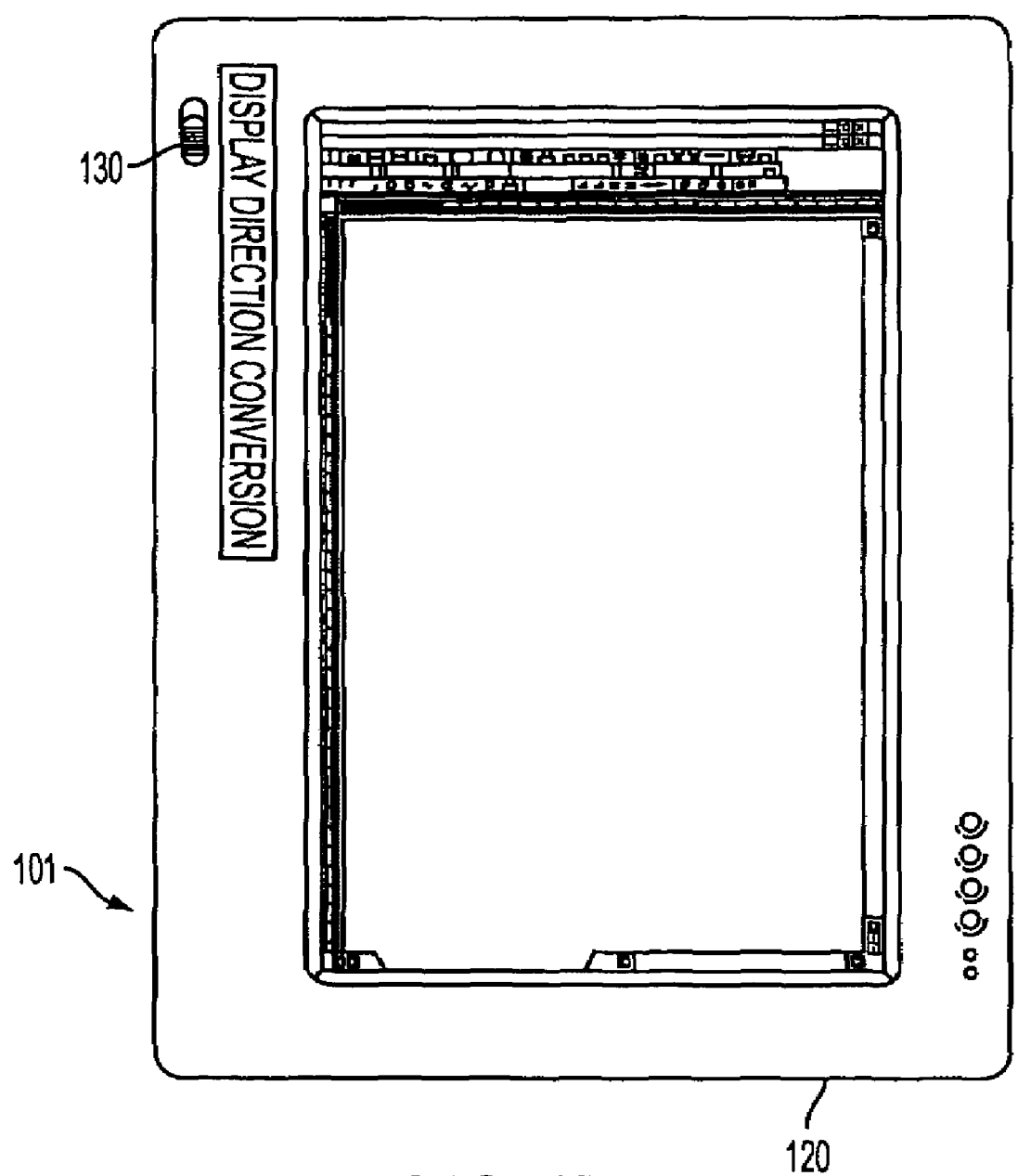
Figure 3:
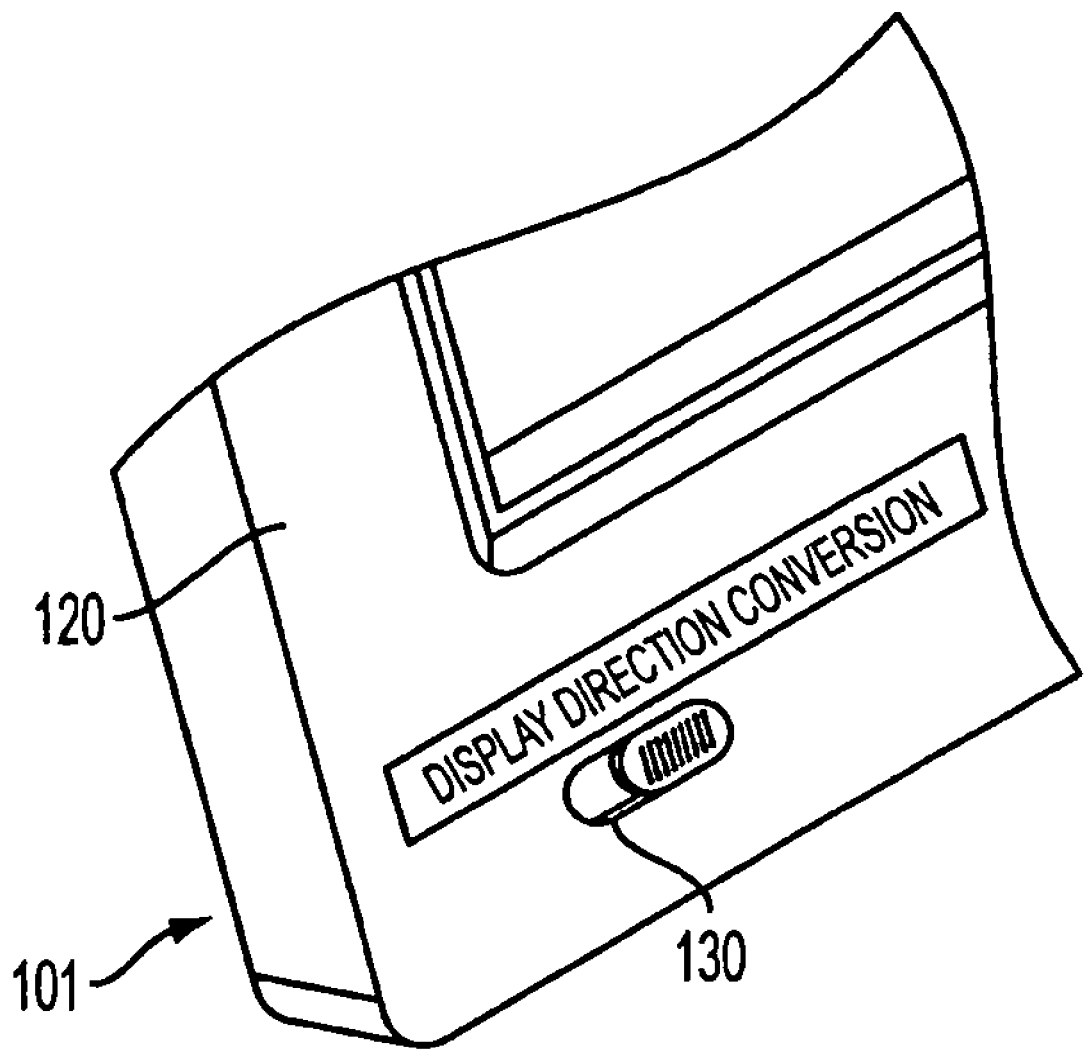
FIG. 3 is a partial enlarged illustration of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
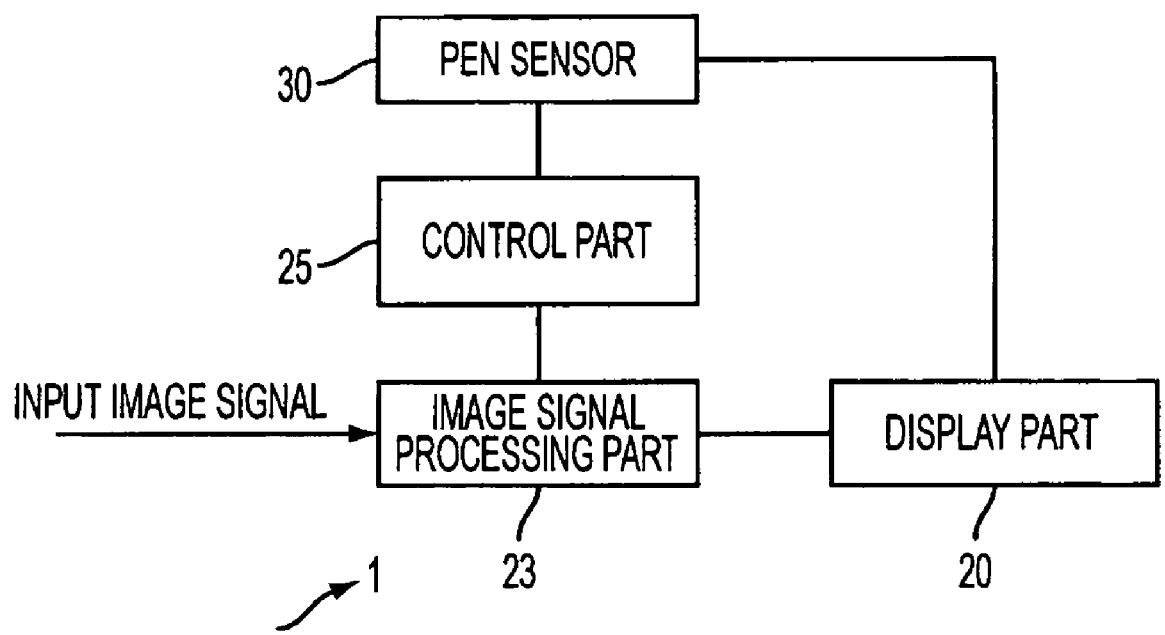
FIG. 4 is a control block diagram of a display, according to an embodiment of the present invention.

FIG. 4 is a control block diagram of a display, according to an embodiment of the present invention. The display 1 comprises a display part 20 displaying an input image signal; an image signal processing part 23 providing the image signal to the display part 20; a pen sensor 30 sensing at least two points of a pen main body on the display part 20 and generating a first pen sensor signal and a second pen sensor signal; and a controller 25 controlling the image signal processing part 23 to display on the display part 20 an image rotated based on the first pen sensor signal and the second pen sensor signal. The display 1 is rotatable.

The image signal input to a display 1 (refer to FIGS. 5A-5D) is converted into an image signal which the display part 20 can display through the image signal processing part 23, and the converted image signal is displayed in the display part 20. According to an aspect of the present invention, the display 1 is, for example, an LCD (Liquid Crystal Display) for a tablet PC, and has a sensor board disposed in the LCD to sense location information of a contacting pen using, typically, a polarized electromagnetic field. The present invention is not limited to an LCD type display, and any other types of displayes accommodating screen sensing including the processes of the present invention as embodied in the pen sensor 30, the controller 25, the image signal processor 23 and the display part 20, can be used.

Figure 7:
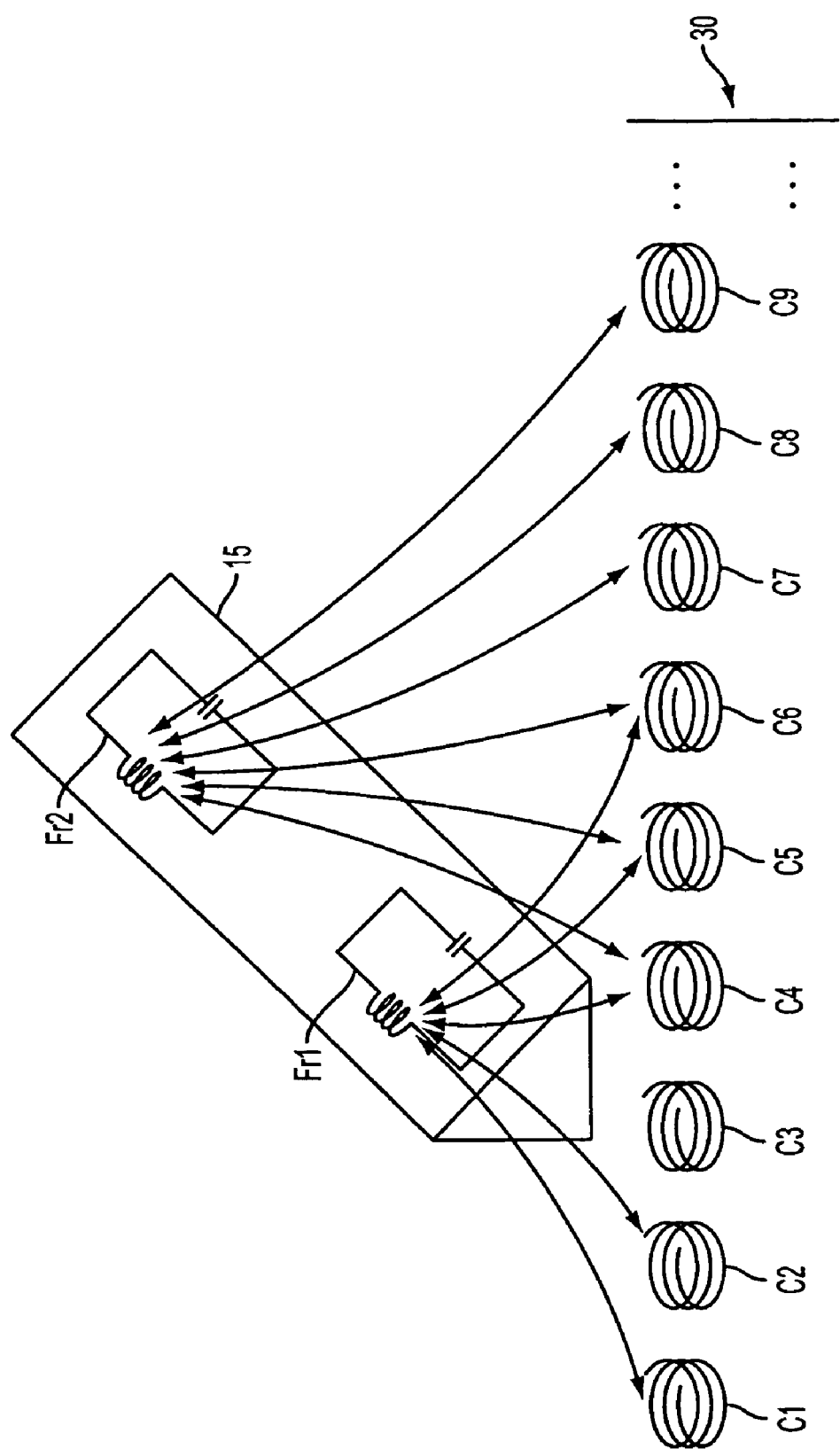
FIG. 7 is a diagram of a pen sensor sensing a location of a pen on a display part of the display shown in FIGS. 5A through 5D, according to an embodiment of the present invention.

FIG. 7 is a diagram of the pen sensor 30 sensing a location of a pen 15 on the display part 20, according to an embodiment of the present invention. Typically, the pen sensor 30 is provided in the display part 20, and senses a position of the pen 15 located (e.g., contacting) on the display part 20. As shown in FIG. 7, the pen sensor 30 has (forms) a sensor board in which a plurality of antenna coils C1 through Cn (C9 as shown) are disposed in a matrix form to sense a signal resonating with built-in resonant circuits (Fr1 and Fr2) of at least two locations in the main body of the pen 15. The pen sensor 30 transmits to the controller 25 pen sensor signals relative to the at least two positions based on signals transmitted to the plurality of antenna coils C1-Cn. Although in the above-described embodiment the pen sensor 30 and the pen 15 are described separately, the pen sensor 30 as described herein may be referred to as a sensing system (device) comprising both the sensor board C1-Cn and the pen 15.

According to an aspect of the present invention, the resonant circuits Fr1 and Fr2 provided in the two points in the pen 15 are designed to resonate according to different resonant frequencies. For convenience, the resonant circuit provided in a front side of the pen 15 can be referred to as a first resonant circuit Fr1, and the other resonant circuit provided in a back side of the pen 15 can be referred to as a second resonant circuit Fr2. The first resonant circuit Fr1 and the second resonant circuit Fr2 are different in resonant frequency, and the two different resonant frequencies are transmitted to the plurality of antenna coils C1 through C9 of the sensor board. More particularly, signals generated from the first resonant circuit Fr1 and the second resonant circuit Fr2 are transmitted between the plurality of antenna coils C1 through C9 and the first and second resonant circuits Fr1 and Fr2 as shown in FIG. 7 with drawn arrows. According to an aspect of the present invention, a BPF (Band-Pass Filter) (not shown) is installed to filter out the two different resonant frequencies, or a frequency separation circuit (not shown) corresponding thereto, thereby allowing generation of pen location signals to directionally control a displayed image according to the pen location signals.

More particularly, the closer the resonant circuits Fr1 and F2 of the pen 15 get to the plural antenna coils C1-C9, the more (stronger) a receiving rate of the resonant frequencies (the stronger the signals) from the resonant circuits Fr1 and Fr2 of the pen 15. According to another aspect of the present invention, the pen sensor (sensor board) 30 further comprises a signal discriminator (not shown and typically implemented as hardware) distinguishing a location of the antenna coils receiving the signals in a maximum rate from among the plural antenna coils. For example, in FIG. 7, a location of the antenna coils receiving the signals from the first resonant circuit Fr1 in the maximum rate is a first location C4, and a location of the antenna coils receiving the signal from the second resonant circuit F2 in the maximum rate is a second location C6.

Therefore, according to the above example, generally the first location is highly likely to be a location in which the first resonant circuit Fr1 provided in the front side of the pen is projected along a line vertically extended from the pen 15 resonant circuit Fr1 to the display part 20, and the second location is a location to which the second resonant circuit Fr2 provided in the back side of the pen is projected along a line vertically extended from the pen 15 resonant circuit Fr2 to the display part 20. The pen sensor 30, especially in the case of using the signal discriminator, transmits signals relative to the sensed first location and the second location by the pen sensor 30 as the first pen sensor signal and the second pen sensor signal, respectively. In other words, the pen sensor 30 generates pen sensor signals in response to resonant frequencies received by the pen sensor 30 from the pen 15.

The controller (controller) 25 receives the first pen sensor signal and the second sensor signal from the pen sensor 30 and decides (determines) coordinates for the first pen sensor signal and the second sensor signal, respectively, and sends a control signal to the image signal processing part 23 to display an image signal whose display direction is converted corresponding to a location of the pen 15 on the display part 20, the pen 15 location calculated based on the determined coordinates. The image signal processing part 23 outputs the image signal whose display direction is converted corresponding to the location of the pen 15 according to the control signal from the controller 25.

A process of determining a proper display direction based on the first pen sensor signal and the second pen sensor signal from the pen sensor 30 will be described by referring to FIGS. 5A through 5D and FIGS. 6A through 6D. FIGS. 5A through 5D are diagrams of display positions in different directions, including a pen position, respectively, according to an embodiment of the present invention. FIGS. 6A through 6D are diagrams showing coordinate axes provided for the display of FIGS. 5A through 5D, including positions and angle degrees corresponding to the pen, to determine the pen location on the display, according to an embodiment of the present invention. In FIGS. 6A through 6D, coordinate axes located on (i.e., overlaid, associated with) the display part 20 screen can be randomly selected by a user with the pen 15. In particular, the controller 25 associates temporary coordinate axes, in which an axis horizontally extended is set as X axis and another axis vertically extended is set as Y axis, with the first and second pen sensor signals received from the pen sensor 30. A black dot on the screen marks the first location, and the white dot marks the second location, which respectively correspond to the first pen sensor signal and the second pen sensor signal received by the controller 25 from the pen sensor 30. With reference to FIGS. 6A through 6D, an angle formed by the X axis and a line connecting the black dot and the white dot is set as θ, and the formed angle corresponds to an appropriate direction of a displayed image with respect to a direction of the display 1. More particularly, the controller 25 sets a coordinates system for the display part 20, and in response to at least two pen location signals from the pen sensor 30, the controller 25 controls the image signal processor 23 to rotate the image displayed on the display part 20 relative to an angle formed by a randomly defined standard line in the set coordinates system and a line connecting coordinates corresponding to the at least two pen location signals. In other words, a rotation of a displayed image is determined based upon a location of the pen 15 relative to a randomly defined line in a set coordinate system, so that, for example, in FIGS. 6A through 6D, the X and Y axes coordinates system provides quadrants, each corresponding to a respective image rotation angle or four directions of 0, 90, 180, and 270 degrees relative to an initial position and selectable by the user using the pen 15.

Typically, at first, the controller 25 receives the first pen sensor signal and the second pen sensor signal from the pen sensor 30, and decides coordinates corresponding to each of the receives first and second pen sensor 30 signals. The determined coordinates are used for calculating the θ angle necessary to rotate the displayed image as the user desires according to the user selection with the pen 15. For example, if the user puts the pen 15 on the display part 20 after placing the display 1 in the direction shown in FIG. 5A, a location of the pen 15 on the display part 20 is approximately sensed as the location shown in FIG. 6A by the pen sensor 30.

Typically, an angle between a body of the user holding the pen and the pen in the user's hand usually forms an acute angle (0°~90°), if the user is right-handed. Therefore, according to an aspect of the present invention, the angle θ formed by the line connecting the first location marked as the black dot and the second location marked as the white dot, and the X axis is set to about 90°. Therefore, in FIG. 6A, the angle θ formed by the line connecting the first location marked as the black dot and the second location marked as the white dot, and the X axis is bigger than 90° and smaller than 180°. As described above with reference to FIGS. 5A and 6A, if the display 1 is placed widthwise and then the pen 15 is positioned on the display part 20, correspondingly the display part 20 image is displayed widthwise, so called in a landscape mode.

Figure 5A:
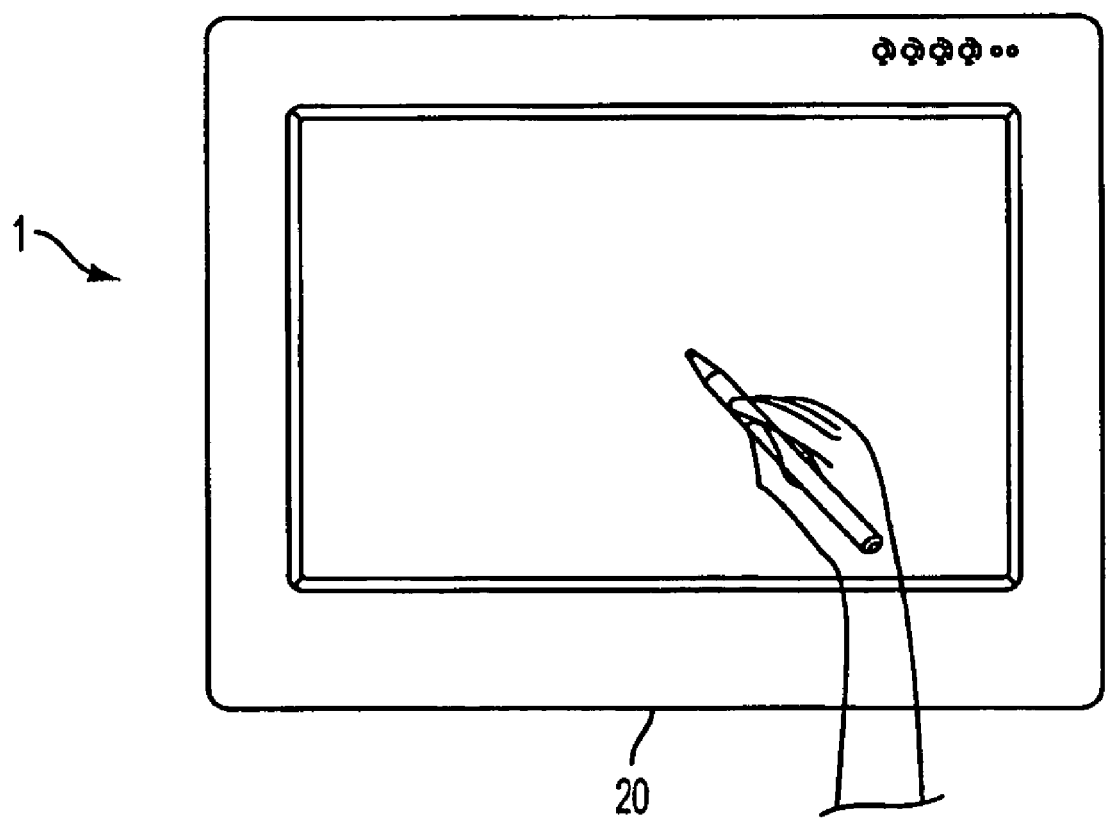
FIGS. 5A through 5D are diagrams of display positions in different directions, including a pen position, respectively, according to an embodiment of the present invention.
Figure 5B:
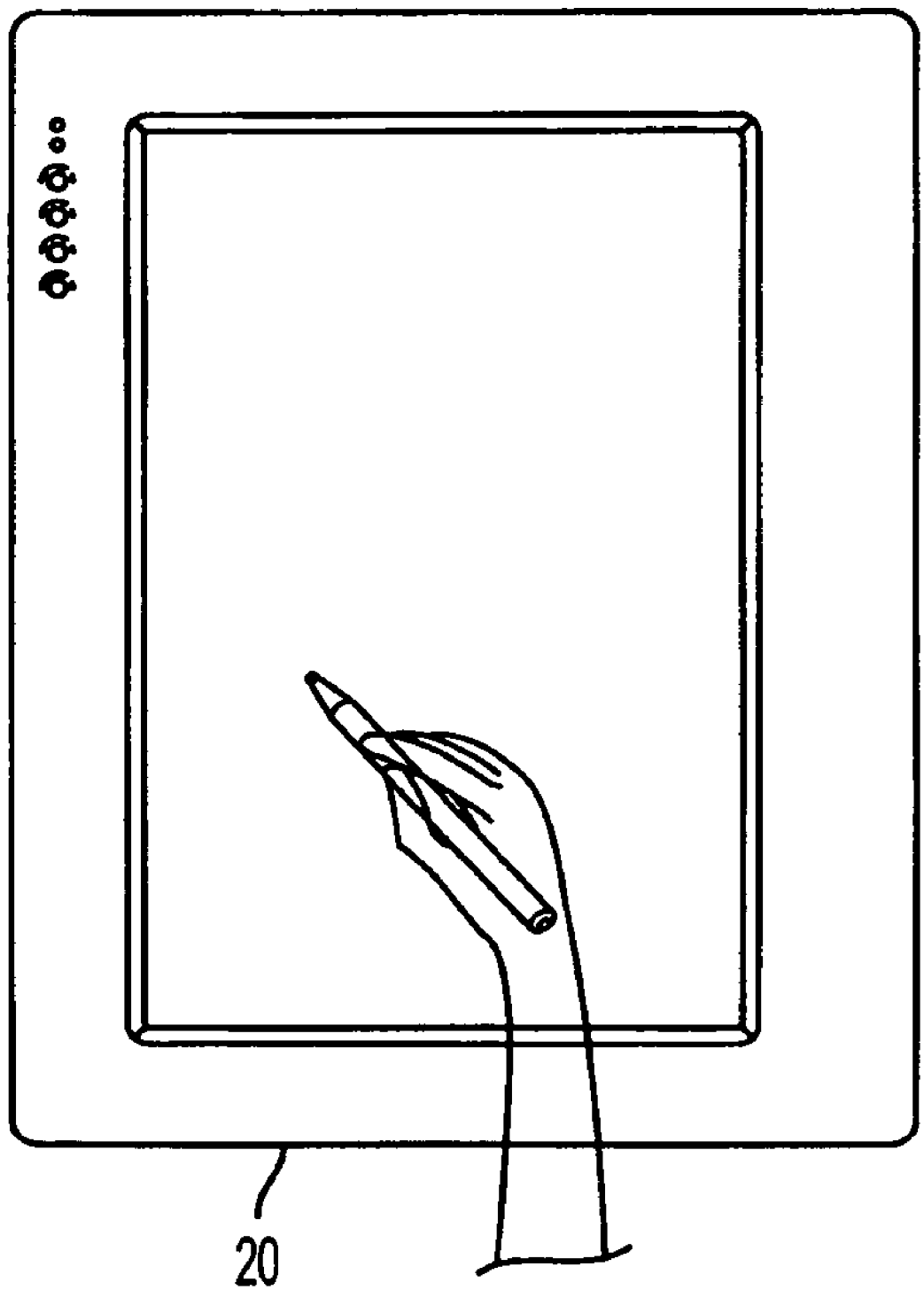
Figure 6A:
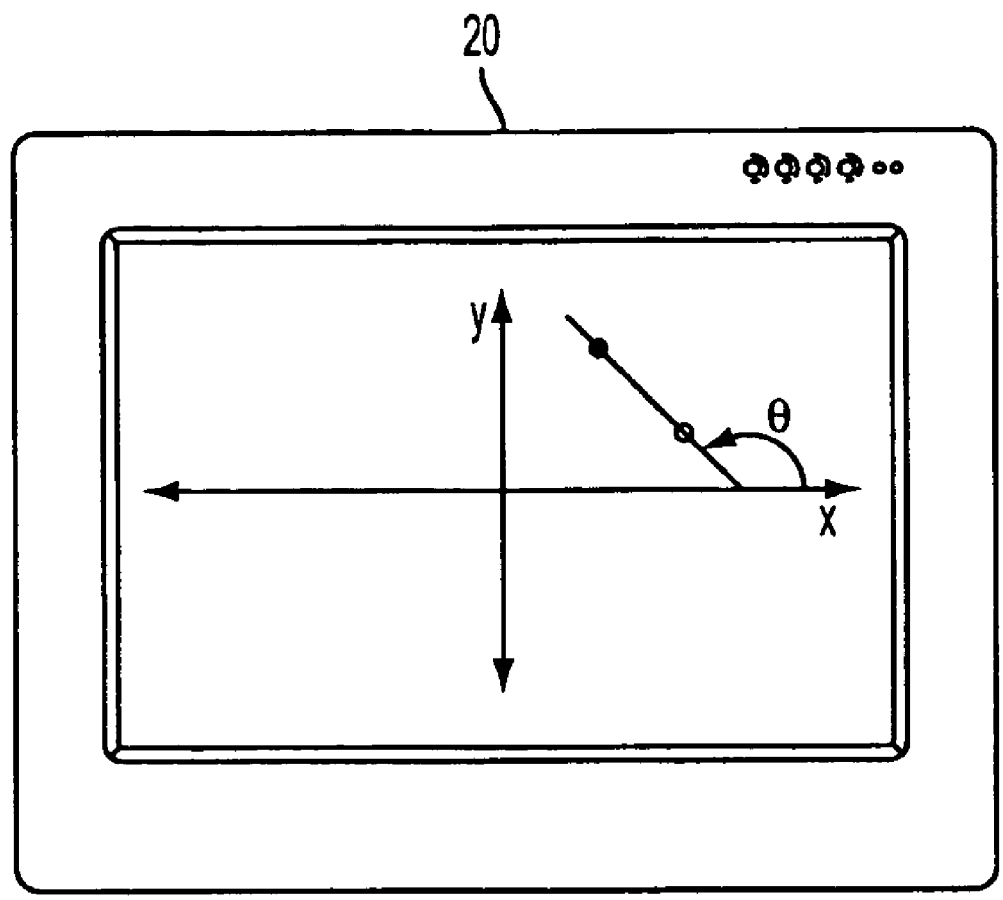
FIGS. 6A through 6D are diagrams showing coordinate axes provided for the display of FIGS. 5A through 5D, including positions and angles degrees corresponding to the pen, according to an embodiment of the present invention.
Figure 6B:
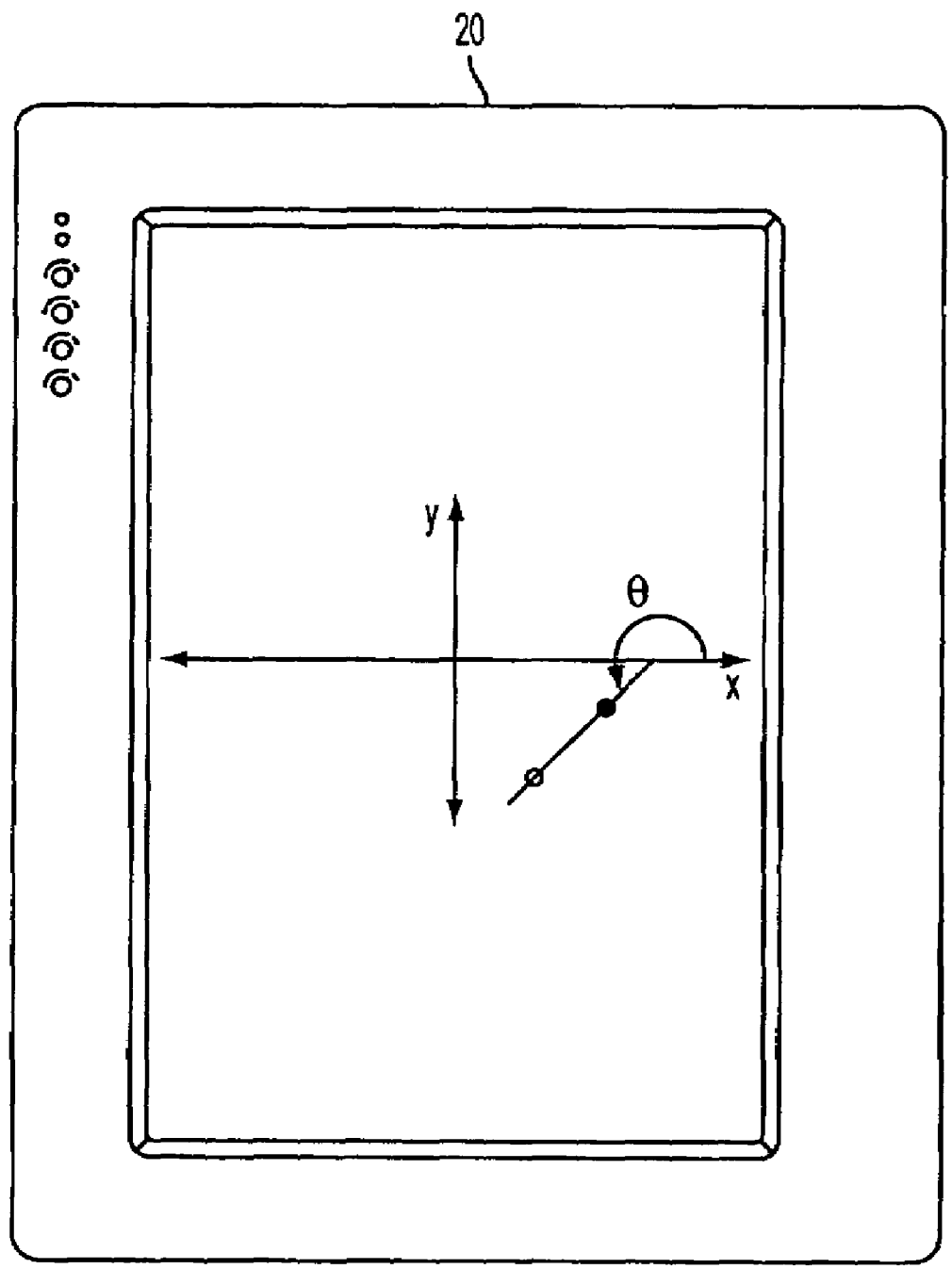

Likewise, if the user places the display 1 as the direction shown in FIG. 5B and positions the pen 15 on the display part 20, the location of the pen 15 on the display part 20 is sensed almost the same location as shown in FIG. 6B by the pen sensor 30. Herein, the angle θ formed by a line, connecting the first location marked as the black dot and the second location marked as the white dot, and the X axis is bigger than 180° and smaller than 270°. As described above with reference to FIGS. 5B and 6B, if the display 1 is placed lengthwise and the pen 15 is positioned on the display part 20, correspondingly the screen of the display part 20 should preferably be displayed in lengthwise, so called in a portrait mode.

Figure 5C:
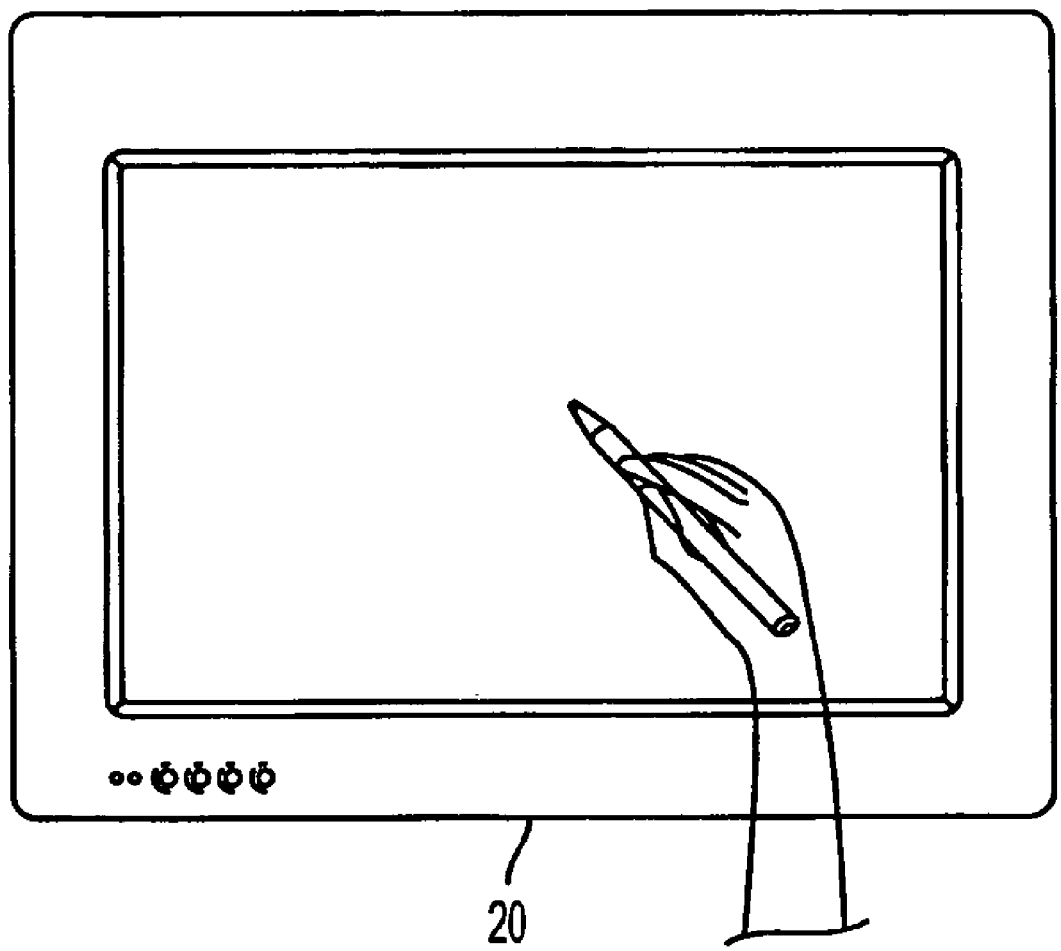
Figure 6C:
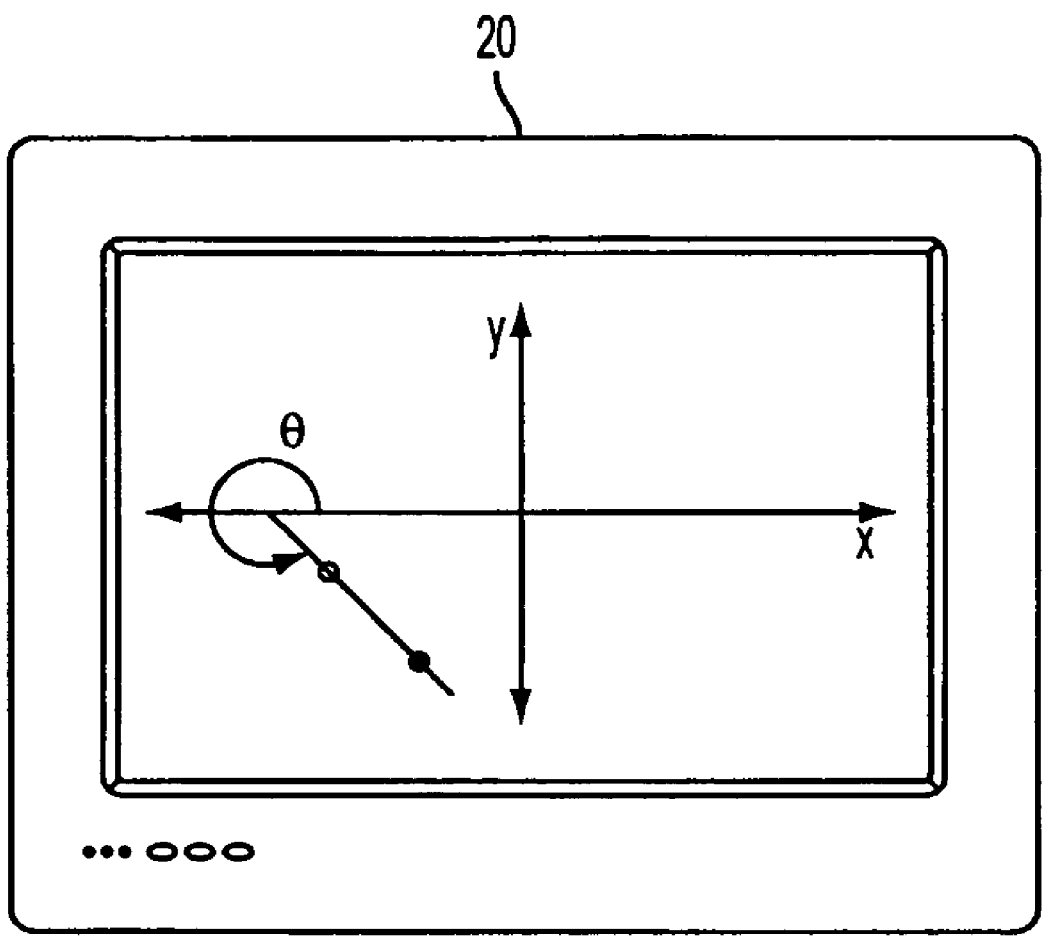

Likewise, if the user places the display 1 in the upside down direction shown in FIG. 5C, and positions the pen 15 on the display part 20, the location of the pen 15 on the display part 20 is sensed as shown in FIG. 6C by the pen sensor 30. In FIG. 6C, for example, the angle θ formed by a line connecting the first location marked as the black dot and the second location marked as the white dot, and the X axis is bigger than 270° and smaller than 360°. As described above with reference to FIGS. 5C and 6C, if the display 1 is placed widthwise upside down and the pen 15 is positioned on the display part 20, correspondingly the display part 20 screen image is displayed widthwise, so called in the landscape mode.

Figure 5D:
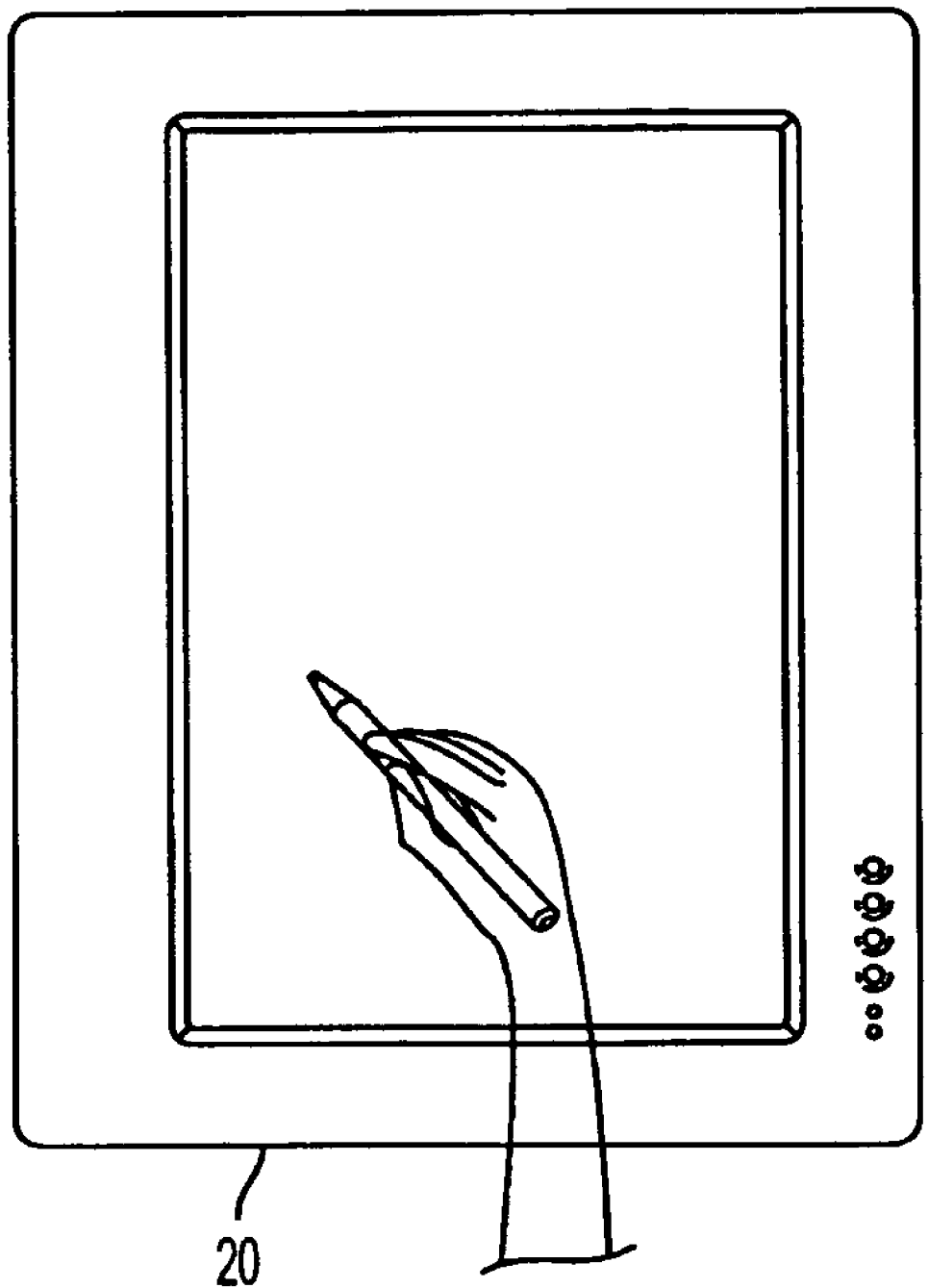
Figure 6D:
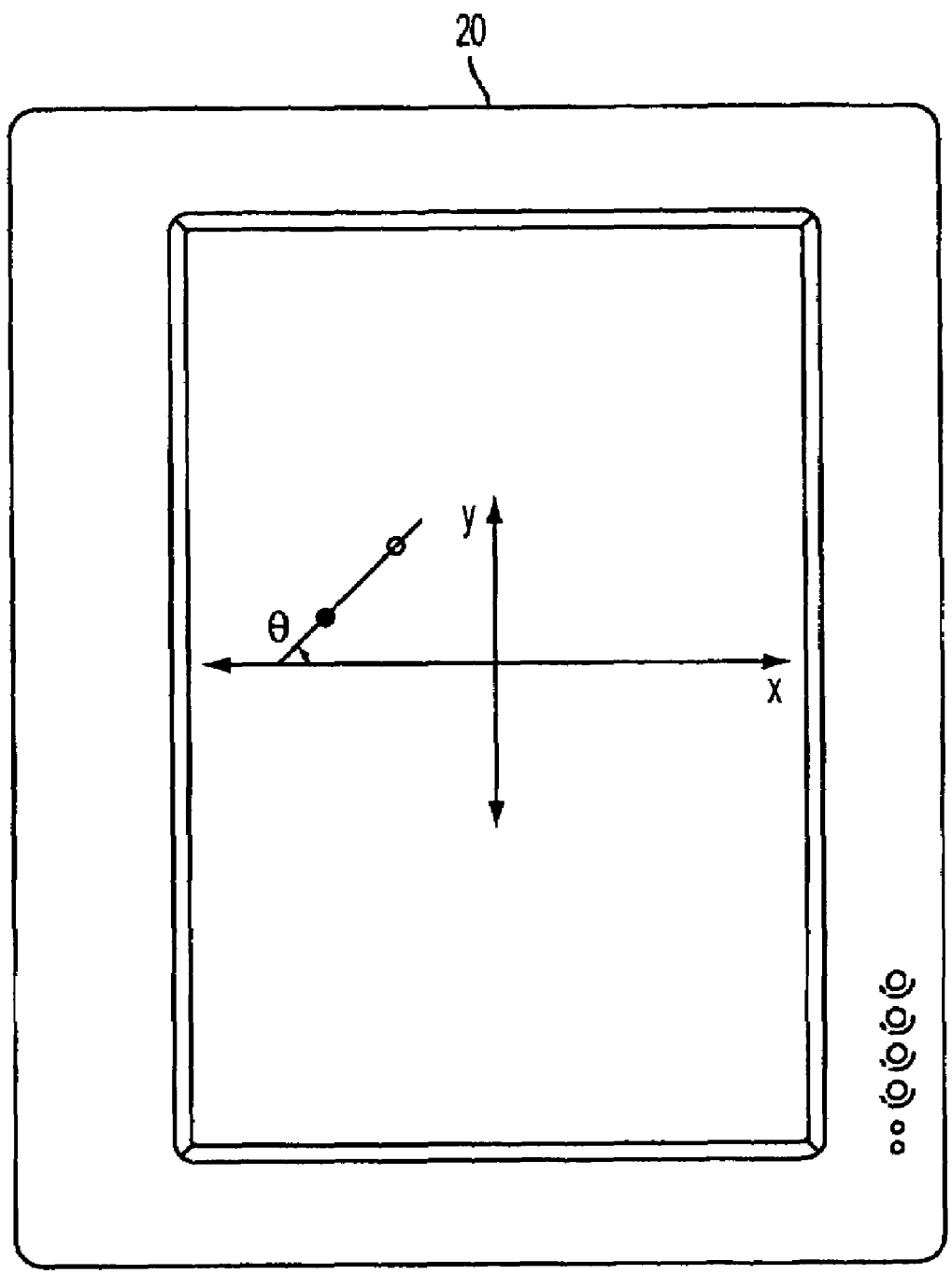

If the user places the display 1 in the direction shown in FIG. 5D but turned rightside left with respect to FIG. 5B, and positions the pen 15 on the display part 20, the location of the pen on the display part 20 is sensed as shown in FIG. 6D by the pen sensor 30. In FIG. 6D, the angle θ formed by a line connecting the first location marked as the black dot and the second location marked as the white dot, and the X axis is bigger than 0° and smaller than 90°. As described above with reference to FIGS. 5D and 6D, if the display 1 is rotated toward the right and placed lengthwise and the pen 15 is positioned on the display part 20, correspondingly the display part 20 screen image is displayed lengthwise, so called in the portrait mode.

The coordinate axes, the line connecting the black dot and the white dot, and the angle θ are described according to the user randomly placing the pen 15 on the display part 20 screen. However, a range of the angle θ, as a factor of determining the screen display direction, can be changed to provide any desired directional display control in response to a user locating a pen on a display screen.

According to an aspect of the present invention, the display 1 is provided in a laptop computer, a notebook computer, a PDA (Personal Digital Assistant), and the like, as a portable computer. Typically, the portable computer comprises the display 1 and a main body connected to the display. Typically, the controller 25 is provided not only inside the display 1, but also inside the main body of the portable computer, as a central processing device. In other words, the controller 25 processes location related information received from the sensing system 30 to approximate, according to a configuration, a rotation location of the pen 15, and controls rotation of a displayed image according to the approximated rotation location of the pen 15.

According to the above-described embodiment of the present invention, the first pen sensor signal and the second pen sensor signal are generated using (in response to) at least two resonant circuits Fr1 and Fr2 built in the pen 15, but the first and second sensor signals could be generated by any device as long as the device senses the location of the pen on the display part 20 screen, and therefore a pen signal generator of the present invention is not restricted to the resonant circuit. Also, although the number of resonant circuits built in the pen 15 is set to 2 in the above-described embodiment of the present invention, more than 2 resonant circuits can be provided in the pen 15 to sense a more accurate and exact location of the display screen contacting pen 15.

With the above configuration, the present invention provides a display sensing an exact display direction a user wants to use without operating a display direction converting switch and displaying an image rotated corresponding to the sensed direction, and a portable computer to which the foregoing display is equipped. More particularly, the present invention provides a display having a display part displaying an image signal, an image signal processor providing the image signal to the display part, a pen sensor sensing at least two locations on a main body of the pen positioned on the display part and generating a first pen sensor signal and a second pen sensor signal, and a controller controlling the image signal processor to display the image as rotated based on the first pen sensor signal and the second pen sensor signal. Therefore, the present invention's display senses an exact display direction which a user wants to use without operating a display direction converting switch and rotates the displayed image according to the sensed display direction. The processes of the present invention to control a direction of a displayed image without using a hardware switch may be implemented in software and/or computing hardware.

More particularly, the present invention provides a computer having a main body and a display part comprising a pen sensor sensing at least two locations on a main body of a pen positioned on the display part and generating a first pen sensor signal and a second pen sensor signal; and a programmed computer processor rotating an image displayed on the display part based on the first pen sensor signal and the second pen sensor signal. According to an aspect of the invention, the pen sensor is provided in the display part. According to another aspect of the invention, the pen sensor comprises at least two resonant circuits in the at least two locations of the main body of the pen and outputting different frequency resonating signals; and a plurality of antenna coils disposed in a matrix form to output the first and second pen sensor signals according to a sensing of the different frequency resonating signals output by the resonant circuits of the pen. According to another aspect of the invention, the pen sensor further comprises a signal discriminator locating from among the antenna coils at least two antenna coils that receive the different frequency resonating signals in a maximum rate, and outputting the first and second pen sensor signals according to the located at least two antenna coils. Further, the present invention may be achieved by a method of performing the processes of the present invention.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display comprising:
    a display part displaying an image;
    an image signal processor providing the image to the display part;
    a pen sensor sensing at least two locations on a main body of a pen positioned on the display part and generating a first pen sensor signal and a second pen sensor signal; and
    a controller controlling the image signal processor to rotate the image displayed on the display part based on the first pen sensor signal and the second pen sensor signal.

2. The display according to claim 1, wherein the pen sensor uses different resonating frequency signals output from resonant circuits respectively built in the at least two locations of the main body of the pen.

3. The display according to claim 1, wherein the controller sets a temporary coordinates system for the display part, and controls the image signal processor to rotate the image relative to an angle formed by a randomly defined standard line in the temporary coordinates system and a line connecting coordinates corresponding to the first sensor signal and the second sensor signal respectively.

4. The display according to claim 2, wherein the controller sets a temporary coordinates system for the display part, and controls the image signal processor to rotate the image relative to an angle formed by a randomly defined standard line in the temporary coordinates system and a line connecting coordinates corresponding to the first sensor signal and the second sensor signal.

5. A portable computer having a main body and a display part comprising:
    an image signal processor providing an image to the display part;
    a pen sensor sensing at least two locations on a main body of a pen positioned on the display part and generating a first pen sensor signal and a second pen sensor signal; and
    a controller controlling the image signal processor to rotate the image displayed on the display part based on the first pen sensor signal and the second pen sensor signal.

6. The portable computer according to claim 5, wherein the pen sensor uses different resonating frequency signals output from resonant circuits built in the at least two locations of the main body of the pen.

7. The portable computer according to claim 5, wherein the controller sets a temporary coordinates system for the display part, and controls the image signal processor to rotate the image relative to an angle formed by a randomly defined standard line in the temporary coordinates system and a line connecting coordinates corresponding to the first sensor signal and the second sensor signal respectively.

8. The portable computer according to claim 6, wherein the controller sets a temporary coordinates system for the display part, and controls the image signal processor to rotate the image relative to an angle formed by a randomly defined standard line in the coordinates system and a line connecting coordinates corresponding to the first sensor signal and the second sensor signal respectively.

9. The display of claim 3, wherein relative to a display direction of the image,
    if the formed angle is bigger than 180° and smaller than 270°, the image is rotated 90 degrees,
    if the formed angle is bigger than 270° and smaller than 360°, the image is rotated 180 degrees, and
    if the formed angle is bigger than 0° and smaller than 90°, the image is rotated 270 degrees.

10. A computer having a main body and a display part comprising:
- a pen sensor sensing at least two locations on a main body of a pen positioned on the display part and generating a first pen sensor signal and a second pen sensor signal; and
- a programmed computer processor rotating an image displayed on the display part based on the first pen sensor signal and the second pen sensor signal.

11. The computer of claim 10, wherein the pen sensor is provided in the display part.

12. The computer of claim 10, wherein the pen sensor comprises:
- at least two resonant circuits in the at least two locations of the main body of the pen and outputting different frequency resonating signals; and
- a plurality of antenna coils disposed in a matrix form to output the first and second pen sensor signals according to a sensing of the different frequency resonating signals output by the resonant circuits of the pen.

13. The computer of claim 12, wherein the pen sensor further comprises a signal discriminator locating from among the antenna coils at least two antenna coils that receive the different frequency resonating signals in a maximum rate, and outputting the first and second pen sensor signals according to the located at least two antenna coils.

14. A method, comprising:
- displaying an image on a display;
- sensing at least two locations on a main body of a pen positioned on the display;
- generating a first pen sensor signal and a second pen sensor signal; and
- rotating the image based on the first pen sensor signal and the second pen sensor signal.

* * * * *